United States Patent [19]
Raburn

[11] Patent Number: 6,152,798
[45] Date of Patent: Nov. 28, 2000

[54] GAME CALL

[76] Inventor: Chris Raburn, 4911 Ogden Hwy., Adrian, Mich. 49221

[21] Appl. No.: 09/417,616

[22] Filed: Oct. 13, 1999

[51] Int. Cl.[7] .................................................. A63H 5/00
[52] U.S. Cl. .......................................... 446/207; 446/397
[58] Field of Search .................................... 446/207, 208, 446/209, 202, 203, 204, 205, 206

[56] References Cited

U.S. PATENT DOCUMENTS

| | | | |
|---|---|---|---|
| 3,406,479 | 10/1968 | Faulk | 46/180 |
| 3,991,513 | 11/1976 | Faulk | 46/180 |
| 4,138,800 | 2/1979 | Lege | 46/180 |
| 4,143,485 | 3/1979 | Stewart | 46/180 |
| 4,211,031 | 7/1980 | Gambino | 46/177 |
| 4,888,903 | 12/1989 | Knight et al. | 43/1 |
| 4,940,451 | 7/1990 | Leady | 446/208 |
| 4,950,201 | 8/1990 | Sceery | 446/207 |
| 5,222,903 | 6/1993 | Parrott et al. | 446/207 |
| 5,230,649 | 7/1993 | Robertson | 446/204 |

*Primary Examiner*—Sam Rimell
*Assistant Examiner*—Urszula M. Cegielnik
*Attorney, Agent, or Firm*—Charles J. Prescott

[57] ABSTRACT

A reed type of game call for attracting waterfowl, other birds and animals, the preferred embodiment particularly adapted for use in calling ducks. Raised ridges or ribs along the tone board surface operatively support the reed and thereby reduce reed malfunction caused by accumulation of moisture from condensate, saliva and spittle. The operator of the game call thus also has better control over the tone produced during repeated operation on a given occasion. The raised ridges, combined with an O-ring-type seal between the mouthpiece and sound assembly and a reed which tapers in width toward its distal end, permit the game call to be operated with less blowing effort by the caller.

5 Claims, 3 Drawing Sheets

GAME CALL

BACKGROUND OF THE INVENTION

1. Scope of the Invention

The present invention relates to a device for calling birds and game animals. While useful in calling a variety of animals and waterfowl, it is particularly adapted for use in calling ducks.

2. Prior Art

Game calls have been used for years by hunters, photographers, bird watchers, and others to attract birds such as waterfowl and other animals to the location of the caller. Better call results are achieved through practice, skill and the expertise of the caller. Various advances have been made over time to better imitate the sounds of the actual animals more closely. For example, in the present art, a call is made in two pieces so that it can be disassembled to permit modification and tuning of the reed. However, accumulation of moisture from condensate, saliva, and spittle between the reed and tone board surface causes calls typical of this type to malfunction, particularity in cold weather. The moisture from condensate, saliva, and spittle mutes or distorts the tone of the call, makes the call erratic, or in extreme cases, makes the call inoperable. This invention modifies the design of the tone board to prevent moisture from accumulating which would otherwise reduce the effectiveness of the call.

Examples of game calls of this prior art type are described in U.S. Pat,. No. 3,406,479 to Faulk and U.S. Pat. No. 4,950,201 to Sceery. Faulk and Sceery show and describe a central groove in the tone board adjacent to the reed. Ledge in U.S. Pat. No. 4,138,800 describes flaring the central groove in the tone board to reduce back pressure and quickens remove of moisture build up from the tongue portion of the call.

Knight in U.S. Pat. No. 4,888,903 shows and describes the use of an O-Ring seal between the mouthpiece and the sound assembly to prevent air from flowing through the joint between those members. Sceery in U.S. Pat. No. 4,950,201 describes making the mouthpiece from a resilient material, preferably rubber, and provides a raised circular rib on the sound assembly that engages the mouthpiece to provide a similar function.

BRIEF SUMMARY OF THE INVENTION

Moisture accumulation between the reed and tone board surface from condensate, saliva, and spittle reduces the effectiveness of the game call especially in cold weather such as might be experienced in a duck blind. The effectiveness of the game call and more particularly control over the tone produced may be made erratic, muted, or inoperable by this moisture accumulation.

One object of this invention is to modify the structure of the tone board with ridges to reduce or eliminate moisture accumulation between the reed and tone board surface.

Another object of this invention is to provide a game call that may be operated in cool or cold environments with better control over the tone of the call for longer periods of time.

Typically the mouthpiece and the sound assembly are secured frictionally at a tapered joint between the two components of the game call. This type of structure permits the game call to be disassembled and the reed modified or tuned to suit the caller. Calls made with these frictional joints have been known to become loose during use and even to slide apart. The use of an O-ring seal as an alternate means of assembly in cooperation with the tone board ridges reduce air leakage and therefore make the game call easier to operate.

It is thus another object of this invention to improve the cooperation between an O-Ring seal and a modified tone board structure providing a call that is easier to handle and operate.

Many modern calls use reeds made of mylar or similar plastic materials. Reeds modified to a tapered profile also make the game call easier to operate.

It is therefore another object of this invention to develop the cooperation between the O-Ring seal, the tapered reed, and the modified tone board structure to provide a game call that is easier to operate.

Although the preferred embodiment of the present invention is for a duck call, the invention has broader application to bird and animal calls.

In accordance with these and other objects which will become apparent hereinafter, the instant invention will now be described with reference to the accompanying drawings.

DETAILED DESCRIPTION OF THE INVENTION

Figure 1:
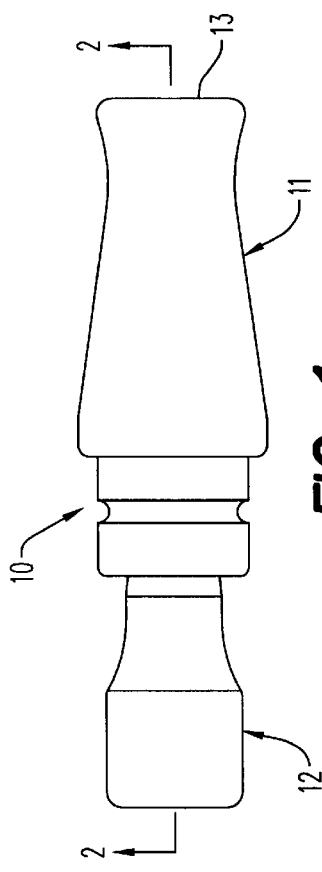
FIG. 1 is a side view of the assembled duck call of the present invention showing the mouthpiece and the sound assembly connected.
Figure 2:
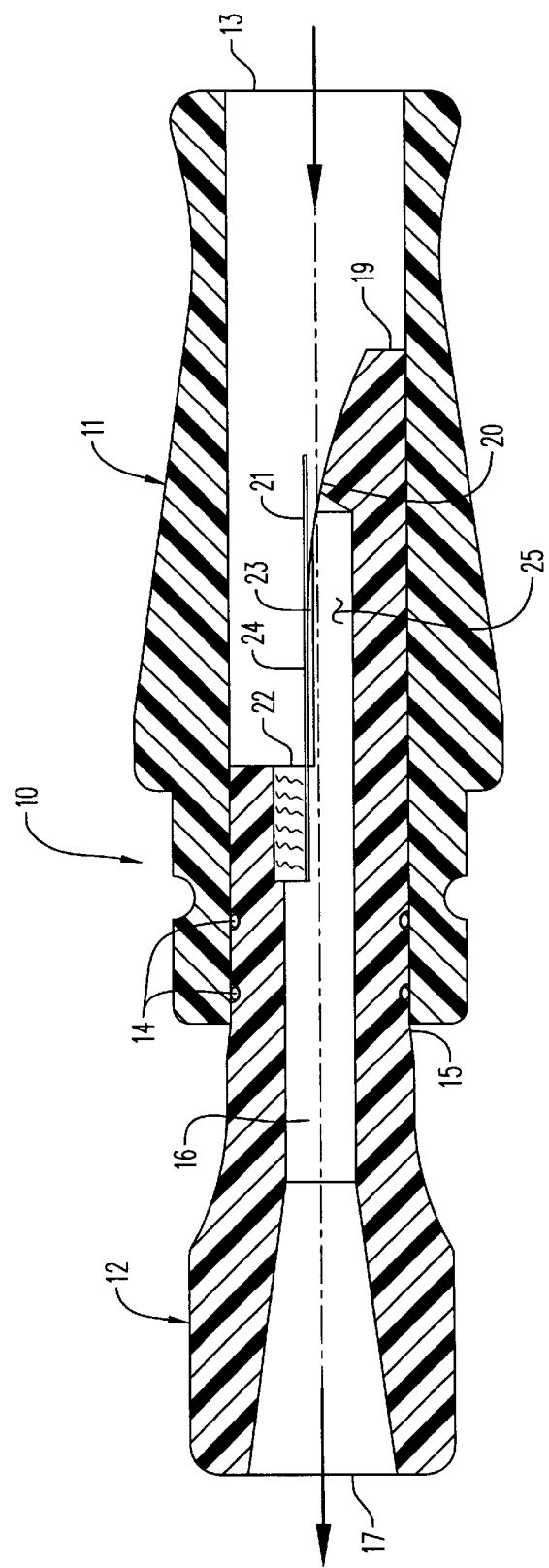
FIG. 2 is a cross-sectioned view of the assembled duck call in the direction of arrows 2—2 shown in FIG. 1.

Referring now to the drawings, the present invention is shown generally as numeral 10 in FIGS. 1 and 2. This game call 10 is designed to produce the sounds of ducks, but may be applied to calls made for other waterfowl, birds, and animals. The game call 10 in the preferred embodiment, is made of acrylic plastic but has application to game calls made of other materials such as wood. Due to the chemical nature of plastic surfaces, the problem with accumulation of moisture between the reed and tone board surface is more critical than with wood game calls which experience the moisture problem to a lesser degree but would still benefit from the present invention. In contrast to plastic game calls, wood game calls soak up some moisture and change tone as moisture is absorbed.

The game call 10 includes a tubular mouthpiece shown generally at numeral 11 and a tubular sound assembly shown generally at numeral 12 joined axially. When assembled as shown in FIG. 1, the game call 10 imitates a duck when air is blown through the end 13 of the mouthpiece 11. Dual O-Rings 14 shown in FIG. 2 are circumferentially disposed around the sound assembly 12 to engage and retain the mouthpiece 11 over sound assembly 12. The O-Rings 14 reduce air loss between the mouthpiece 11 and sound assembly 12 when the game call 10 is operated and prevent the game call 10 from sliding apart during use. To assemble the game call 10, the mouthpiece 11 is slid over the sound assembly 12 until wedged tightly against the taper 15 shown in FIG. 2. The taper 15 serves as a locator and a stop; positioning the tubular mouthpiece 11 and tubular sound assembly 12 in proper axial orientation with respect to each other.

Figure 3B:
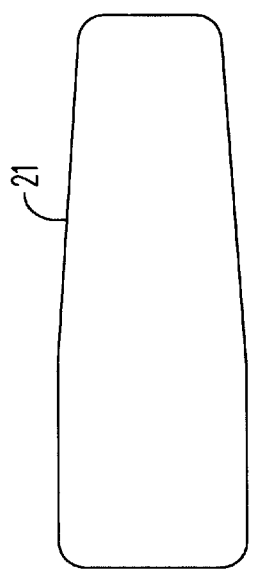
FIG. 3B is a top plan view of the reed of FIG. 3A.
Figure 3A:
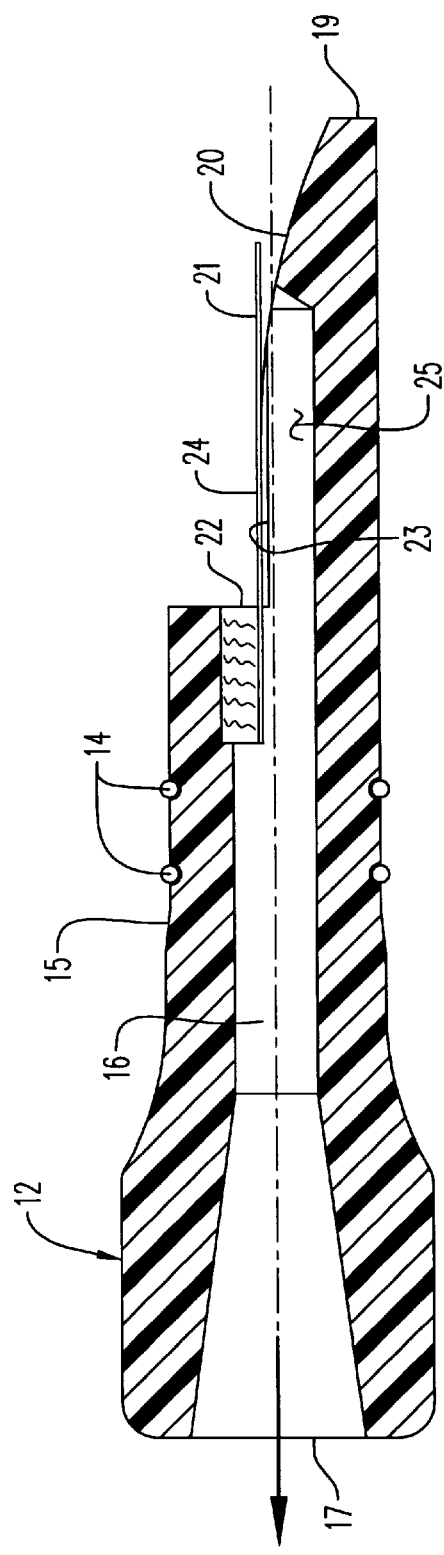
FIG. 3A is a cross-sectioned view of the sound assembly showing details of the O-Ring seal, reed, reed retainer, and tone board.
Figure 4:
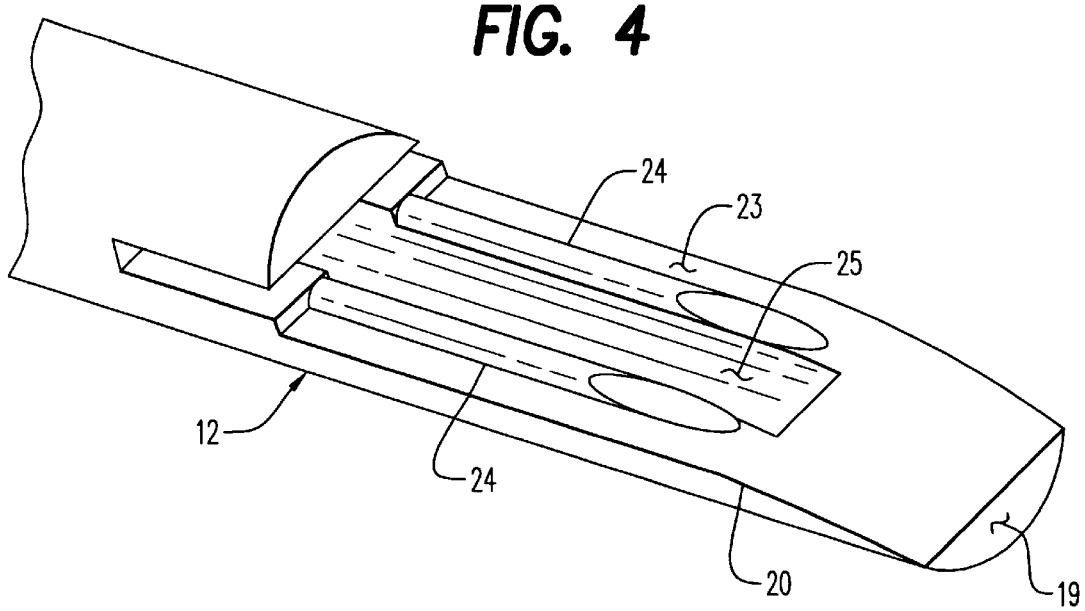
FIG. 4 shows a detail the portion of the sound assembly of FIG. 3 in perspective view showing the arrangement of ridges and with the reed removed for clarity.
Figure 5:
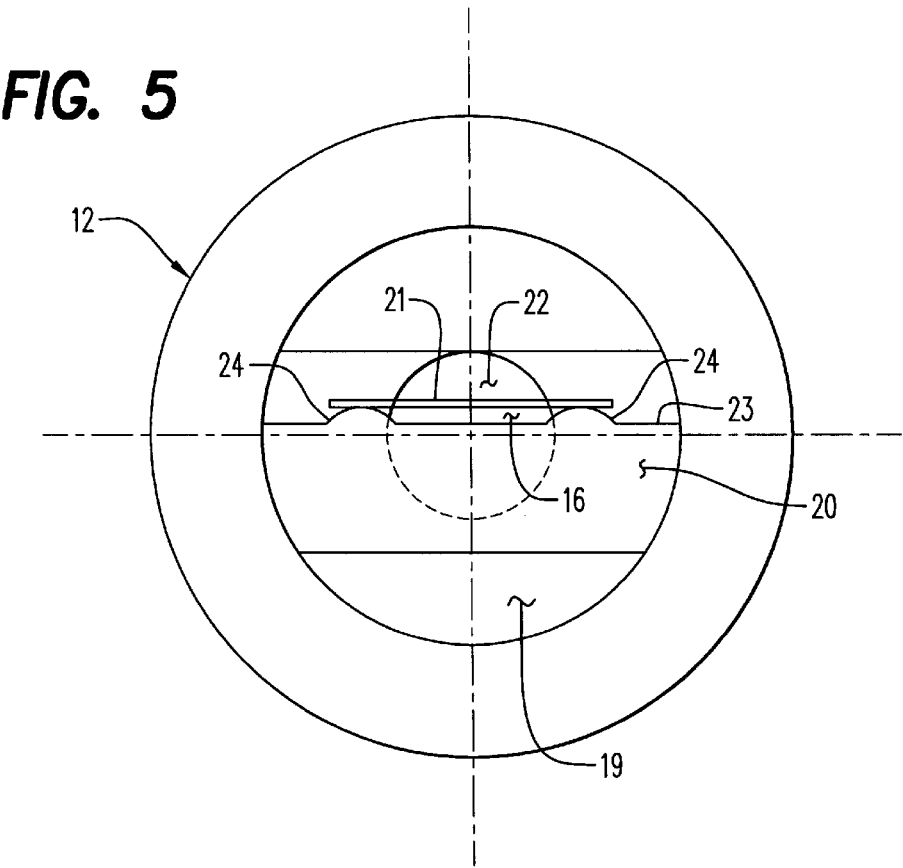
FIG. 5 is an end view of the sound assembly of FIG. 4 showing the details of the ridges.

The sound assembly 12 as shown separately in FIG. 3A comprises a tone board 20, a reed 21, and a reed retainer 22. The reed retainer 22 is typically made of cork, but other resilient materials may be used. The reed 21 in the present invention is a thin, flat, flexible mylar member approximately 0.010 inches thick. The reed 21 may be rectangular in shape. However in the preferred embodiment the reed 21 removed and shown in plan view in FIG. 3B is tapered slightly as it extends away from the reed retainer 22 toward the distal end thereof. The taper in the reed 21 works with the other elements of the invention reducing the back pressure of the game call 10 and thereby making the game call 10 easier to operate. The sound assembly 12 as best seen in FIGS. 3A, 4 and 5 is a generally tubular member having an axial central bore 16 slightly flared outward at opening 17 where the sound exits. The central bore 16 forms a conduit for airflow through the game call 10 in the direction of the arrows. The central bore 16 does not extend the full length of the sound assembly 12, but rather becomes a semicircular groove 25 at the reed retainer 22 and continues as a semicircular groove 25 terminating just above the distal end of the reed 21. The tone board 20 curves downward away from the reed 21 generally blending into end surface 19 of the sound assembly 12.

In prior art, the tone board surface 23 as shown in FIGS. 4 and 5 beneath the reed 21 is a flat, smooth surface. In the present invention the tone board surface 23 includes two spaced apart ridges or ribs 24 longitudinally extending and disposed along either side of the semicircular groove 25. Game calls made according to prior art experience moisture accumulation from condensate, saliva, and spittle between the reed and this flat surface. The present invention modifies the tone board surface 23 from that of a flat surface to a surface containing ridges or ribs 24. The ridges or ribs 24 reduce or eliminate the accumulation of moisture between the reed 21 and the tone board surface 23 itself. The ridges or ribs 24, while still providing the necessary support and contact with the reed 21, reduce the contact surface area where moisture may accumulate between the reed 21 and the tone board surface 23 and facilitate ejection of accumulated moisture during normal operation of the game call. The ridges or ribs 24 also provide less restriction to air flow and in combination with O-Rings 14 and tapered reed 21, in the preferred embodiment, provide less air loss resulting in a call requiring less effort to operate.

In the preferred embodiment the ridges or ribs 24 have a semicircular profile as shown in FIG. 6. However, other regular or irregular cross-sectional shapes are envisioned within the scope of this invention. The ridges or ribs 24 are longitudinally disposed on the tone board surface 23 adjacent to the reed 21 adjacent to the rim of the circular groove 25.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A game call comprising:
   an elongated generally tubular-shaped mouthpiece having a longitudinal bore formed therethrough and an inlet at one end thereof through which to blow air;
   an elongated generally tubular-shaped sound assembly sealingly attached to said mouthpiece, said sound assembly having an airflow conduit formed part way therethrough in airflow communication with said inlet, one end of said airflow conduit defining an exit end of said sound assembly;
   another end of said airflow conduit terminating at a mid-portion of said sound assembly within said longitudinal bore and becoming a groove positioned centrally along a substantial portion of a remaining length of said sound assembly;
   said sound assembly also having a tone board extending along said groove to another end of said sound assembly;
   said tone board defining a generally flat tone board surface extending along either side of said groove, an arcuate end portion, and a ridge or rib extending above said tone board surface along either side of said groove;
   a reed restrained at one end thereof and longitudinally extending along a substantial portion of said tone board and above said ridges or ribs in spaced relation to a substantial portion of said tone board thereby reducing moisture accumulation between said tone board surface and said reed, a distal unsupported end of said reed extending along a portion of said arcuate end portion vibrating in response to air being blown into said game call through said inlet.

2. A game call as set forth in claim 1, wherein:
   said reed is tapered in width toward a distal end thereof to reduce blowing effort to operate said game call.

3. A game call as set forth in claim 1 wherein:
   said mouthpiece and tone board are sealingly connected by a plurality of elastic seals to prevent air passage therebetween.

4. In a game call of the manually blowable type which includes an elongated generally tubular-shaped mouthpiece having a longitudinal bore formed therethrough and an inlet at one end thereof through which to blow air, an elongated generally tubular-shaped sound assembly sealingly attached to said mouthpiece, said sound assembly having an airflow conduit formed part way therethrough in airflow communication with said inlet, one end of said airflow conduit defining an exit end of said sound assembly, another end of said airflow conduit terminating at a mid-portion of said sound assembly within said longitudinal bore and becoming a groove positioned centrally along a substantial portion of a remaining length of said sound assembly, said sound assembly also having a tone board extending along said groove to another end of said assembly, said tone board defining a generally flat tone board surface extending along either side of said groove, an arcuate end portion and a reed restrained at one end thereof and longitudinally extending along a substantial portion of said tone board, the improvement comprising:
   a ridge or rib extending above said tone board surface along either side of said groove;
   said reed positioned above against said ridges or ribs in spaced relation to a substantial portion of said tone board thereby reducing moisture accumulation between said tone board surface and said reed, a distal unsupported end of said reed extending along a substantial portion of said arcuate end portion vibrating in response to air being blown into said game call through said inlet.

5. A game call as set forth in claim 4, wherein:
   said reed is tapered toward a distal end thereof to reduce blowing effort to operate said game call.

* * * * *